United States Patent
Chen et al.

(10) Patent No.: US 8,515,939 B2
(45) Date of Patent: Aug. 20, 2013

(54) METHOD AND SYSTEM FOR FACILITATING RULE-BASED DOCUMENT CONTENT MINING

(75) Inventors: Yi Chen, Beijing (CN); Yuliang He, Beijing (CN)

(73) Assignee: Lonsou (Beijing) Technologies Co., Ltd., Beijing (CN)

( * ) Notice: Subject to any disclaimer, the term of this patent is extended or adjusted under 35 U.S.C. 154(b) by 779 days.

(21) Appl. No.: 12/296,490

(22) PCT Filed: Apr. 10, 2007

(86) PCT No.: PCT/CN2007/001151
§ 371 (c)(1),
(2), (4) Date: Oct. 8, 2008

(87) PCT Pub. No.: WO2007/115501
PCT Pub. Date: Oct. 18, 2007

(65) Prior Publication Data
US 2009/0265339 A1    Oct. 22, 2009

(30) Foreign Application Priority Data

Apr. 12, 2006  (CN) .......................... 2006 1 0072533
Apr. 10, 2007  (WO) ................ PCT/CN2007/001151

(51) Int. Cl.
*G06F 17/30*    (2006.01)

(52) U.S. Cl.
USPC .......................................................... 707/708

(58) Field of Classification Search
USPC .......................................................... 707/708
See application file for complete search history.

(56) References Cited

U.S. PATENT DOCUMENTS

| | | | |
|---|---|---|---|
| 6,725,426 B1 | 4/2004 | Pavlov | |
| 2001/0032218 A1* | 10/2001 | Huang | 707/513 |
| 2004/0039934 A1* | 2/2004 | Land et al. | 713/200 |
| 2004/0230597 A1* | 11/2004 | Wookey | 707/101 |
| 2005/0005259 A1* | 1/2005 | Avery et al. | 717/103 |
| 2006/0015299 A1* | 1/2006 | McDermott et al. | 702/184 |
| 2006/0230100 A1* | 10/2006 | Shin et al. | 709/203 |
| 2007/0038894 A1* | 2/2007 | Stasa et al. | 714/38 |
| 2007/0112717 A1* | 5/2007 | Serrano-Morales et al. | 706/47 |
| 2007/0124269 A1* | 5/2007 | Rutter et al. | 707/1 |

* cited by examiner

*Primary Examiner* — Wilson Lee
*Assistant Examiner* — Thuy Bui
(74) *Attorney, Agent, or Firm* — Shun Yao; Park, Vaughan, Fleming & Dowler LLP

(57) ABSTRACT

A system for facilitating rule-based content mining to extract content from structured or unstructured data receives a file that contains structured or unstructured data, or a mixture of both. The system then generates a processable extensible markup language (pXML) file based on the received file. The system further extracts content from the pXML file based on one or more rules and generates a semantic XML file based on a specified format.

14 Claims, 3 Drawing Sheets

METHOD AND SYSTEM FOR FACILITATING RULE-BASED DOCUMENT CONTENT MINING

BACKGROUND

1. Field of the Invention

The present invention relates to data management. More specifically, the present invention relates to a system and a method for extracting content from structured or unstructured documents.

2. Related Art

Extensible Markup Language (XML), a subset of Standard Generalized Markup Language (SGML), is a set of specification defined by the Word Wide Web Consortium (W3C) to facilitate the organization and exchange of information. Information contained in well-structured XML files can ensure reliability and interoperability among different applications across the Internet. Consequently, XML can significantly reduce the costs associated with data management and exchange by allowing exchange of data with different formats.

XML can also be used to define industry-specific content models. Once the content model is determined, different applications can use this content model to mark up information so that the information can be shared easily and effectively. For example, XML is widely used in areas such as electronic commerce, information-intense services, and telecommunication.

Unfortunately, majority of the information available on the Internet, especially on the Web, is either unstructured or structured with non-interoperable format. As a result, many publicly available documents cannot be easily shared, managed, and stored. This problem is further exacerbated by the proliferation of portable devices, which often have non-uniform display mechanisms.

Hence, a need arises for a system and a method for extracting content from documents and displaying such content on portable devices.

SUMMARY

One embodiment of the present invention provides a system for facilitating rule-based content mining to extract content from structured or unstructured data. During operation, the system receives a file which contains structured or unstructured data, or a mixture of both. The system then generates a processable extensible markup language (pXML) file based on the received file. The system further extracts content from the pXML file based on one or more rules and generates a semantic XML file based on a specified format.

In a variation of this embodiment, extracting content from the pXML file involves applying a rule engine to the pXML file.

In a further variation, the rule engine comprises one or more map objects to analyze and extract content from the pXML file.

In a further variation, the map object has a map object name, a plug-and-play switch, an activation switch, and an activation order.

In a further variation, the map object comprises: one or more input rules, one or more output rules, and one or more sub-map objects and/or sub-rules.

In a further variation, the input rule can be a text-based input rule or an element-based input rule.

In a further variation, the text-based input rule can be a text-analysis rule or a tag-syntax rule. A text-analysis rule can include one or more of: a line rule, a fixed-length rule, a regular expression rule, a hypertext-tag rule, and a text-matching rule. A tag-syntax rule can include one or more of: a sequence rule, a block OR rule, a repetition rule, a template-object rule, a symbolic tag rule, a numeric tag rule, a string rule, an existence rule, a non-existence rule, a word rule, a word-capitalization rule, and an empty rule.

In a further variation, the element-based input rule can be an elementary or advanced element-based input rule. An elementary element-based input rule can include one or more of: a combination rule, a comparison rule, a steno rule, a mixture rule, an ownership rule, an execution rule, an XML path-language assessment rule, and a miscellaneous rule. An advanced element-based input rule can include one or more of: a syntax sequence rule, a head-tail sequence rule, and a sub-map object rule.

In a further variation, the output rule can be one or more of: a "not specified" rule, a "complete input text" rule, an "input" rule, a "constant" rule, a "sub result" rule, a "maximum sub result" rule, an "average sub result" rule, and a "table mapping" rule.

In one variation of this embodiment, generating the semantic XML file based on the specified format comprises applying an XLST file or an external program and generating an application-specific XML file.

Figure 1:
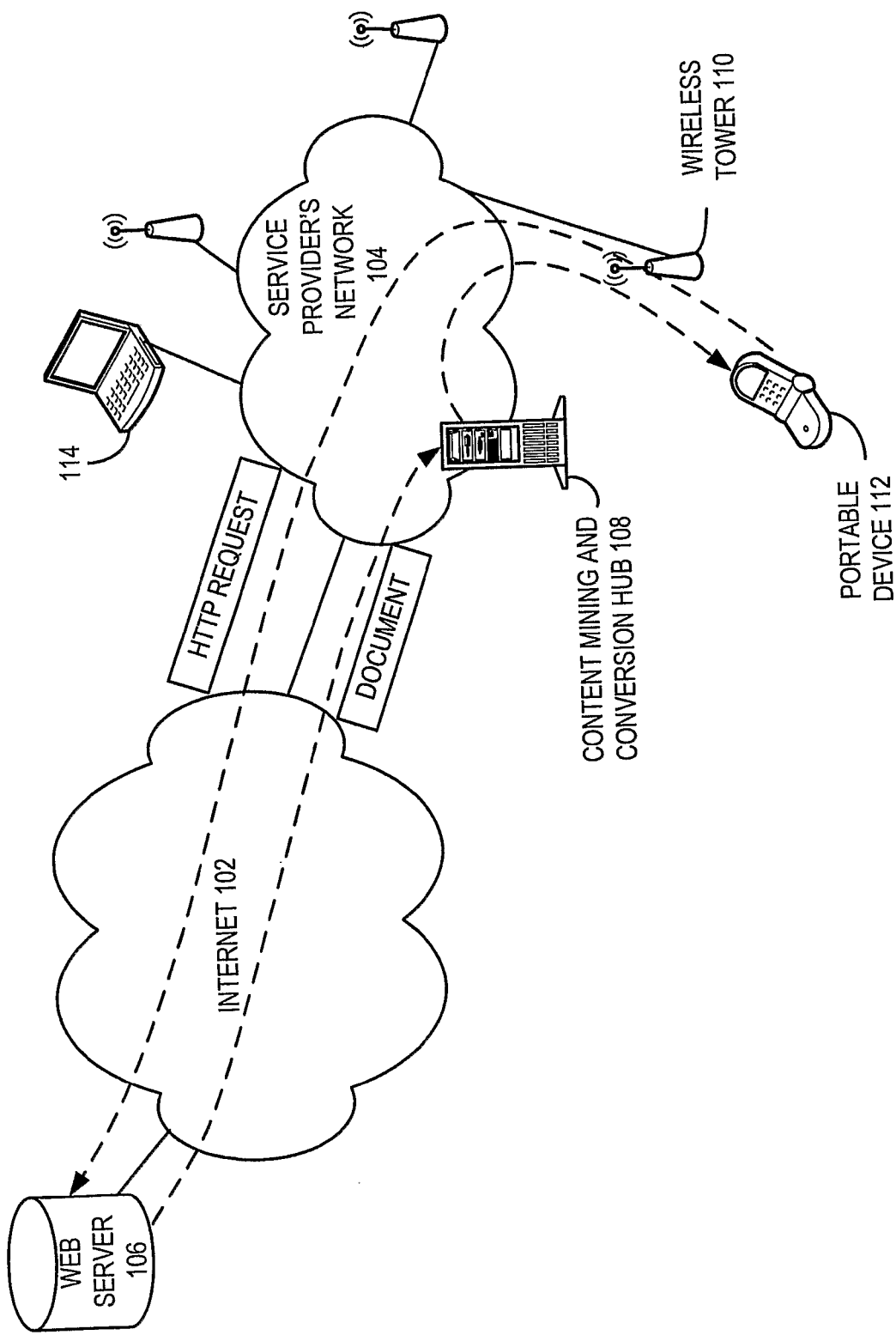
FIG. 1 illustrates the operation of a rule-based document content mining system in accordance with one embodiment of the present invention.

TABLE 1 illustrates an exemplary instance of a map object in accordance with one embodiment of the present invention.

TABLE 2 illustrates an exemplary instance of a map template which transforms an HTML document into a Docbook XML document in accordance with one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now know or later developed.

Overview

Currently, unstructured documents comprise majority of all information online. That is, majority of the information is not organized to allow identification and separation of the context of the information from its content. Document and content management systems cannot digest unstructured information without significant human intervention. As a result, majority of information cannot be economically used in automated processes or in intelligent information management.

To provide a standard for describing structured data, the World Wide Web Consortium (W3C) has developed the Extensible Markup Language (XML) standards. XML facilitates standardized description of structured data and allows software developers and content authors to more easily organize data on the Internet. The XML standards are expected not only to meet the ever-increasing demand for data on the Internet, but also to ensure superior data reliability and interoperability. The capability of XML to define file types facilitates more convenient expression and more structured organization of information. Users can now use a uniform format to organize and transfer data, which can significantly lower the cost of data exchange and management.

Embodiments of the present invention provide a system for facilitating rule-based document content mining. The system uses a set of rules to parse information in a structured or unstructured document, and convert the document content into a semantic XML file. By using a rule-based content mining tool, the system can accept any type of text content, structured or unstructured, and convert the content into semantic, structured data which can be readily processed, managed, or displayed by different applications or devices. This content mining system allows data of different types and formats to be organized and seamlessly exchanged, and improves the reusability of text contents.

FIG. 1 illustrates the operation of a rule-based document content mining system in accordance with one embodiment of the present invention. A user uses an Internet-enabled portable device 112, such as a smart phone, to issue an HTTP request for a web page that contains a document. A wireless tower 110 receives the wireless signal from portable device 112 and relays this request through the service provider's network 104. Network 104 can be either landline based or wireless, and can be either public or private. The HTTP request is then forwarded to the Internet 102.

After receiving the HTTP request, a Web server 106 responds with the requested document. Note that a document generally can include any type of text or non-text content. For example, the returned document can contain a PDF file, a WORDML file, an RTF file, an EXCEL file, a POWERPOINT file, a WORD file, a LATEX file, or a FRAMEMAKER file.

In conventional networks, the returned document is directly delivered to portable device 112. Consequently, the document can suffer garbled presentation on portable device 112 which may have screen size unsuitable for displaying the document. Note that application of embodiments of the present invention is not restricted to portable device 112. Other forms of computing devices, such as mobile device 114, can also benefit from the present invention.

One embodiment of the present invention provides a content mining system that extracts information from different types of structured or unstructured documents and produce semantic XML documents which can be properly displayed on a wide range of devices or processed by different applications. In one embodiment, service provider's network 104 directs the returned document to a content mining and conversion hub 108. Content mining and conversion hub 108 analyzes the text content within the received document and converts the content into a structured, semantic document.

Content mining and conversion hub 108 can further use XSL Transformations language (XSLT) or other external programs to generate other forms of files, such as a Wireless Markup Language (WML) file, an XHTML-Mobile Profile (XHTML-MP) file, or a Compact HTML (cHTML) file, and sends the file to portable device 112. This file can contain both text and graphic information.

Rule-Based Content Mining

Figure 2:
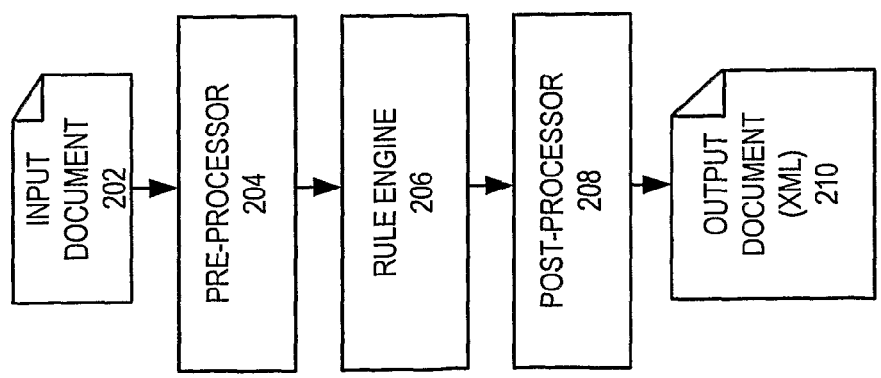
FIG. 2 illustrates an exemplary block diagram of a rule-based content mining system in accordance with one embodiment of the present invention.

FIG. 2 illustrates an exemplary block diagram of a rule-based content mining system in accordance with one embodiment of the present invention. In one embodiment, the content mining system includes a pre-processor 204, a rule engine 206, and a post-processor 208. Pre-processor converts an input document 202 into a processable XML (pXML) file based on a set of pre-processing rules. Rule engine 206 then performs text mining and content extraction to certain elements in the pXML file, Subsequently, post-processor 208 coverts the extracted content to an output file 210 based on a given format.

Note that the system can selectively use the three functional blocks (pre-processor 204, rule engine 206, and post-processor 208) based on the actual need of the application. If the system is used to re-format the input document for proper display, the system can use only pre-processor 204 and post-processor 208 to produce a specifically formatted document. If the system is used to extract content from the input document and exchange this content with another application, the system can use only pre-processor 204 and rule engine 206. If the system is used to extract content from the input document and re-format the document for proper display, then the system can use all three blocks.

Pre-Processing

In one embodiment, pre-processor 204 can accommodate any text-content file as its input. For example, the input can be a hyper-text file, a PDF file, a MICROSOFT OFFICE document, a piece of source code, a simple text file, an ADOBE Maker Interchange Format (MIF) file, a LATEX file, or an XML file. Note that pre-processor 204 can use any file-analysis drivers. Such file-analysis drivers can be based on open-standard or proprietary file formats.

In one embodiment, the system uses format-specific drivers to analyze input files. These format-specific drivers can be directed to unstructured files, such as Web files, PDF files, WORDML files, RTF files, EXCEL files, POWERPOINT files, WORD files, LATEX files, and FRAMEMAKER files. When pro-processing structured files, the driver can covert the document content into a standard, semantic file. A driver directed to structured file can have special interface program specific to the structured file format, such as a driver program for a database system.

In general, pre-processor 204 generates a pXML file. The pXML file format is defined as follows. First, pXML format contains a number of elements: XMLSTREAM, HEAD, DMETATAGS, DMETA, EMETATAGS, EMETA, DSTYLES, DSTYLE, DSTRUCTURE, BODY, SECTION, PAGE, PARAGRAPH, SPECIALTEXT, TEXT, IMAGE, LINK, FOOTNOTE, ENDNOTE, HEADER, FOOTER, ANCHOR, TAB, HR, MARKER, TABLE, TGROUP, TBODY, THEAD, TFOOT, ROW, CELL, COLUMN, COLUMN-DEF, LIST, LI, LABEL, BLOCKQUOTE, PRE, BREAK, FRAME, SVG, FIELD, and INDEXITEM.

These elements are also defined to have the following attributes: style, css-style, number, font, font-size, font-fixed, origfont, emphasis, emphasis-bold, emphasis-italic, emphasis-underline, emphasis-superscript, emphasis-subscript, x, y, height, width, top, left, align, valign, leftindent, rightindent, spacebefore, spaceafter, textindent, border-left, border-right, border-top, border-bottom, top-padding, left-padding, right-padding, bottom-padding, rowspan, colspan, width-type, and height-type.

Specifically, the elements are given the following definition:

(1) Element XMLSTREAM is the root element, can have elements HEAD and BODY as child elements, and does not have defined attributes;

(2) Element HEAD describes the header information for the file, can have element XMLSTREAM as a parent element, can have elements DMETATAGS, EMETATAGS, and DSTRUCTURE as child elements, and does not have defined attributes;

(3) Element DMETATAGS describes meta tags and attributes of the file, can have element HEAD as a parent element, and element META as a child element;

(4) Element META describes an individual attribute of the file, has element DMETATAGS as a parent element, does not have any child elements, and has a META name and value;

(5) Element EMETATAGS describes a set of environment attributes during the generation of the processable extensible markup language file, can have element HEAD as a parent element, and can have element EMETA as a child element;

(6) Element EMETA describes an individual environment parameter during the generation of the processable extensible markup language file, can have element EMETATAGS as a parent element, does not have any child elements, and has an EMETA name and value;

(7) Element DSTYLES describes style attributes of the file, can have element HEAD as a parent element, and can have element STYLE as a child element;

(8) Element STYLE describes the layout format of the file, can have element DSTYLES as a parent element, and can have the following attributes:
name, font, font-size, font-fixed, align, valigh, leftindent, rightindent, linespacing, spacebefore, spaceafter, emphasis, emphasis-bold, emphasis-italic, emphasis-underline, emphasis-superscript, and emphasis-subscript;

(9) Element DESTRUCTURE describes bookmarks in a PDF file, and can have element HEAD as a parent element and element OUTLINE as a child element;

(10) Element BODY describes the main body of the file, can have the XMLSTREAM element as a parent element and any block element as child element, including elements SECTION, PAGE, and BLOCK;

(11) Element SECTION describes sections in a Microsoft WORD® file, can have BODY as a parent element, can have any block element as a child element, and has the following attributes:
number, orientation, height, width, margin-left, margin-top, margin-right, margin-bottom, section-type, and columns;

(12) Element PAGE describes a signal page in a multi-page file, can have element BODY as a parent element, and any block elements, including elements PARAGRAPH, IMAGE, TABLE, LIST, BLOCKQUOTE, PRE, ANCHOR, BREAK, and FRAME as child elements; wherein element PAGE further has the following attributes:
number, height, width, margin-left, margin-top, margin-right, and margin-bottom;

(13) Element PARAGRAPH describes text in the file, can have elements BODY, CELL, LI, BLOCKQUOTE, SECTION, and PAGE as parent elements, can have #PCDATA, SPECIALTEXT, LINK, ANCHOR, IMAGE, TEXT, and FLELD as child elements; and have the following attributes:
front-related, paragraph-related, emphasis-related, number, style, x, y, height, and width;

(14) Element SPECIALTEXT describes text within element PARAGRAPH which has a different formatting style from a regular formatting style of element PARAGRAPH, can have element PARAGRAPH as a parent element, can have elements #PCDATA, SPECIALTEXT, LINK, ANCHOR, IMAGE, TEXT, and FIELD as child elements, and have the following attributes:
font-related, emphasis-related, number, style, x, y, height, and width;

(15) Element TEXT describes text within element PARAGRAPH which has the same formatting style as element PARAGRAPH, can have element PARAGRAPH as a parent element, can have #PCDATA, SPECIALTEXT, LINK, ANCHOR, IMAGE, TEXT, and FIELD as child elements, and have the following attributes:
font-related, emphasis-related, number, style, x, y, height, and width;

(16) Element IMAGE describes images in the file, can have elements BODY, PAGE, CELL, LI, BLOCKQUOTE, PRE, and PARAGRAPH as parent elements, and have the following attributes:
herf, which is an image file name which indicates a relative path name for the image,
format, which indicates a format of the image,
width and height, which indicate the width and height of the image, respectively,
x and y, which indicate a position of the image with regard to a page,
number, which indicates a location of the image relative to other images or paragraphs, and
alt, which indicates a text describing the image in hypertext;

(17) Element LINK describes links, contains text description, can have elements PARAGRAPH and SPECIALTEXT as parent elements, can have #PCDATA, and SPECIALTEXT as child elements, and have attributes href and alt;

(18) Elements FOOTNOTE and ENDNOTE describe footnotes and endnotes of the file, can be placed within element PARAGRAPH or at the end of the file, can have elements BODY and PARAGRAH as parent elements and block elements as child elements, and have the following attributes:
ref, reftype, and label.

(19) Elements HEADER and FOOTER describe headers and footers of the file, can be placed within element PARAGRAPH or at the end of the file, can have element BODY as a parent element and block elements as child elements, and have the following attributes:
number, which indicates the number of the section where the HEADER or FOOTER element is located,
headerType, which indicates whether the header is on a first page, a last page, an odd page, or an even page, and footerType, which indicates whether the footer is on a first page, a last page, an odd page, or an even page;

(20) Element ANCHOR describes a Uniform Resource Identifier (URI), can be placed inside or outside a PARAGRAPH element, can have elements BODY, PAGE, CELL, LI, BLOCKQUOTE, PRE, PARAGRAPH, and SPECIALTEXT as parent elements, and have attributes name and number, wherein attribute number indicates the ANCHOR element's relative location in the file;

(21) Element TAB describes a tab character in the file;

(22) Element HR describes a hypertext file;

(23) Element MARKER describes a termination character in the file, can have element PARAGRAPH as a parent element, and has attributes id and number which indicates a location of the element MARKER;

(24) Element TABLE describes a table within the file, can have elements BODY, PAGE, SECTIONCELL, LI, BLOCKQUOTE, and PRE, can have elements TGROUP, COLUMN, and ROW as child elements, and has attribute number which indicates a location for the element MARKER;

(25) Elements TGROUP, TBODY, THEAD, and TFOOT describe a table within the file and have attribute cols which indicates the number of rows in the TGROUP element;

(26) Element ROW is a child element of the TABLE element, describes a row within a table, can have element CELL as a child element, and can have the following attributes:
rowtype, wherein a value of "header" indicates the row to be a header row, and a value of "data" indicates the row to be a regular row;
style, which indicates the formatting style of the row; and
number, which indicates a location of the row relative to the file;

(27) Element CELL is a child element of the ROW element, describes a cell within a table, can have elements PARAGRAPH, LIST, TABLE, BLOCKQUOTE, PRE, IMAGE, and ANCHOR as child element, and have the following attributes:
celltype, which indicates the type of the cell,
wherein a value of "header" for celltype indicates that the cell is a header cell, and
wherein a value of "data" for celltype indicates that the cell is a regular cell,
style, which describes the formatting style of the cell, and
number, which indicates a location of the cell relative to the file;

(28) Element COLUMN is a child element of the TABLE element, describes a single column in a table, can have elements TABLE and TGRPOUP as parent elements, does not have any child elements, and has the following attributes:
column-id, which indicates an index number of the column in the table, and
width, which indicates a width of the column;

(29) Element COLUMN-DEF defines a column in a table, can have element TABLE as a parent element and element COLUMN as a child element, and has attribute cols, which indicates a number of columns;

(30) Element LIST describes a list in the file, can have element LI as a child element, and has the following attributes:
type, which indicates the type of the list, and which can be of value "OL," "UL," or "DL," wherein "OL" denotes an ordered list, "UL" denotes an unordered, floating list, and "DL" denotes an unordered, non-floating list,
number, which indicates a location for the list in the file, and
style, which indicates a formatting style of the list;

(31) Element LI is a child element for the LIST element, describes a list item, can have elements PARAGRAPH, LIST, TABLE, LI, BLOCKQUOTE, PRE, IMAGE, and ANCHOR as child elements, and has the following attributes:
level, which indicates a nesting level for the list,
number, which indicates a location of for the list item in the file,
style, which indicates a formatting style of the list item, and
type, which can have a null value or a value of "DT" or "DL" when the list to which the list item belongs is of type "DL," indicating the list item to be a header item or a data item, respectively;

(32) Element LABEL is a child item of the LI item, describes a Microsoft WORD® document, can have elements PARAGRAPH and LI as parent elements, and has element #PCDATA as a child element;

(33) Element BLOCKQUOTE describes a nested text, can have a block container as a parent element and a block-level element as a child element, and can have an attribute number which describes a location for the nested text in the file;

(34) Element PRE presents encapsulated text with original layout and formatting, can have a block container as a parent element and a block-level element as a child element, and can have an attribute number which describes a location for the encapsulated text in the file;

(35) Element BREAK describes a break character in the file, can have any element as a parent element, does not have a child element, and has the following attributes:
type, which indicates the breach character's type, such as a page break, a column break, or a line break, and
number, which indicates a location of the break character in the file;

(36) Element FRAME describes a text frame in the file, has elements BODY, SECTION, and PAGE as parent elements, can have any block element as a child element, and has attributes x, y, top, left, height, width, and number;

(37) Element SVG describes an external Scalable Vector Graphics (SVG) file included in a PDF file, has element PAGE as a parent element, does not have any child element, and has attribute src, which indicates a relative or absolute file name for the SVG file;

(38) Element FIELD describes a field embedded in the file which typically appears in a Microsoft WORD® file, can have elements PARAGRAPH, TEXT, SPECIALTEXT as parent elements, and element #PCDATA as a child element, and has attribute code which describes a field code; and

(39) Element INDEXITEM describes an index item within an Adobe FRAMEMAKER® Maker Interchange Format (MIF) file, can have elements PARAGRAPH, TEXT, SPECIALTEXT as parent elements, can have element INLINE as a child element, and has the following attributes:

primary, which indicates a primary index item, secondary, which indicates a secondary index item, and tertiary, which indicates a tertiary index item.

The attributes are defined as follows:

(1) Attribute style indicates a formatting style for the PARAGRAPH or SPECIALTEXT element;

(2) Attribute css-style describes a hyper-text file, wherein if the hyper-text file includes a "paragraph" element with a "style" attribute which further includes a Cascading Style Sheets (CSS) attribute, the css-style attribute includes the CSS attribute of the hyper text file verbatimly;

(3) Attribute number indicates a location of an element in the file, and comprises a value not less than 1;

(4) Attributes font, font-size, font-fixed, and origfont describe attributes related to fonts, wherein the font attribute specifies the font name, the font-size attribute specifies an absolute font size in a Microsoft WORD® file or a PDF file or a relative font size in a hyper-text file, the font-fixed attribute is a Boolean variable wherein a "true" value indicates a font with a fixed width, and wherein the origfont attribute indicates an original font in the file;

(5) Attributes emphasis, emphasis-bold, emphasis-italic, emphasis-underline, emphasis-superscript, emphasis-subscript, which comprise Boolean variables, indicate a formatting style of a font, wherein emphasis-bold indicates a font to be bold, emphasis-italic indicates a font to be italic, emphasis-underline indicates a font to be underlined, emphasis-superscript indicates a font to be superscript, and emphasis-subscript indicates a font to be subscript;

(6) Attributes x, y, height, width, top, and left describe special formatting styles of the file, wherein x and y indicate a coordinate within a page and can be of absolute or relative values, height and width indicate the height and width of a text or graphics object, and top and left indicate the distance a text or graphics object is from the edges of a page;

(7) Attributes align, valign, leftindent, rightindent, spacebefore, spaceafter and textindent describe formatting styles of a paragraph, wherein align indicates horizontal alignment and has value "left," "center," "right", "justify," or "blank," which indicate left aligned, center aligned, right aligned, justified, or blank, respectively, valign indicates vertical alignment and has value "top," "middle," "bottom," or "blank," which indicate top aligned, middle aligned, bottom aligned, or blank, respectively, leftindent indicates the amount of left indentation of the paragraph, rightindent indicates the amount of right indentation of the paragraph, linespacing indicates the amount of space between two lines and has a default value of "1" which denotes single spacing, spacebefore indicates the amount of space before a paragraph begins, spaceafter indicates the amount of space after a paragraph ends, and textindent indicates the amount of indentation of a first line of the paragraph;

(8) Attributes border-left, border-right, border-top, border-bottom comprise either numerical or Boolean values, and describe respectively whether a text block or a table cell has left, right, top, or bottom border, wherein each attribute can further specify the color of the corresponding border;

(9) Attributes top-padding, left-padding, right-padding, bottom-padding comprise integer values and indicate a color which is filled between a top, left, right, or bottom border and the content of a cell, respectively;

(10) Attributes rowspan and colspan comprise numerical values and indicate the row span and column span of a table, respectively;

(11) Attributes width-type and height-type describe tables within a Microsoft WORD® file, and can have the following values:

"auto," which indicates that the width or height of a text object is automatically adjusted, "percent," which indicates that the values of width or height of a text object is a percentage value, "points," which indicates that the values of width or height of a text object is a value measured in points, and "fixed," which indicates that the width or height of a text object is fixed.

Note that the definition described above is only one embodiment of the present invention. Other variations of pXML definition are also possible.

During operation, a file-analysis driver recognizes components in the input document, such a paragraph, table, image, link, page, and frame, and converts these components to corresponding pXML elements, such as PARAGRAPH, TABLE, IMAGE, LINK, PAGE, and FRAME.

Rule Engine

After the system performs pre-processing on the input document using file-analysis drivers and produces a pXML file, the system applies the rule engine to extract content from the pXML file. In one embodiment, the rule engine includes a map template which corresponds to the input document or the generated pXML file. The system uses the map rules in the map template to analyze the content of the pXML file and produces semantic documents in compliance with given standards.

Each map rule contains at least one map object. The rule engine uses a map object to analyze a document, extract content, and to represent the extracted content with XML. That is, a map object is used to convert a document into a set of semantic, clearly defined XML-based rules. A map template can have one or more map objects. Each map object is defined by tags based on the output XML file format.

In one embodiment, a map object can include an input rule, an output rule, and sub-map objects.

An input rule of a map object is used to search for specific content in the input file, which can be a pXML file. This process can also be viewed as an input-selection process, similar to the process of searching for certain content in a word processor program. Based on an input rule, the rule engine identifies specific text from the file and marks the identified text. In one embodiment, an input the rule can be a Boolean combination of multiple criteria. A rule engine can determine what text matches the rule using pattern-recognition techniques.

An output rule is used to create an XML element as the output of the map object. The result created by the output rule includes the attributes, content, and tag names of the XML element.

Sub-map objects and sub-rules are used to process selected input content in a hierarchical manner.

In one embodiment, a map object has the following attributes and functions.

Each map object has a name which is used by the rule engine to track and call the map object. Each map object's name is unique within the map template.

A map object has a plug-and-play switch. Generally, a map object cannot start automatically. A map object is started when the corresponding map template is started or when the map object is called by other map objects. Therefore, the default state of plug & play switch is "off," indicating that the map object is only started when the corresponding map template is started or when the map object is called by other map object.

A map object also has an activation switch. When the rule engine actives all the map objects, only those with their activation switches in the "on" state can be activated. The default state of an activation switch is "off."

Each map object is assigned an activation order. When the rule engine activates all the map objects, the map objects are called based on their activation order, until each map object's input rule is successfully applied.

Input Rules

Input rules are essential for a map object, because input rules determines how a map object analyzes the input text or data. If the input content is a text stream or a text document, the application of input rules can be viewed as a text-selection process. If the input content is an XML file or a data stream, the application of input rules can be viewed as an element-selection process. Therefore, based on the input format, input rules can be divided into two categories. The first category includes text-based input rules for text content such as text documents and #PCDATA in an XML file. Text-based input rules can locate certain text content in a text file or a piece of specified text content. The second category include element-based input rules for structured data content such as pXML files generated from WORD, PDF, FRAMEMAKER, or HTML files. In one embodiment, the rule engine first identifies the matching elements using the element-based input rules, and then analyzes the located elements using text-based input rules.

The text-based input rules are used to analyze text content from text documents or elements. Text-based input rules can contain text-traverse, text-analysis, and/or tagging syntax rules. Text-based input rules can also be divided into text-analysis rules and tag-syntax rules.

The text-analysis rules further include line rules, fixed-length rules, regular expression rules, hypertext-tag rules, and text-matching rules. These rules are defined as follows.

A line rule is used to select the content of a specific line in the input text content.

A fixed-length rule is used to select the content of a specific, fixed length in the input text content.

A regular-expression rule is used to select text content based on regular expressions.

A hypertext-tag rule is used to extract content marked by matching hypertext tags in the input text content.

A text-matching rule is used extract specified content based on a start character string and an end character string.

The tag-syntax rules can also be considered as word-syntax rules, and use syntax analysis to analyze input text content. In one embodiment, tag-syntax rules can include sequence rules, block OR rules, repetition rules, template-object rules, symbolic tag rules, numeric tag rules, string rules, existence rules, non-existence rules, word rules, word-capitalization rules, and empty rules. These rules are defined as follows.

Sequence rule are the default rules in tag-syntax rules. The system uses sequence rules to select tags in the vicinity of the current text position. An effective sequence rule typically contains sub rules which can find matches within a certain line of the input text content. A sequence rule can have a map object or other tag-syntax rules as sub-rules. A sequence rule can also be a sub-rule.

Block OR rules are exchange rules. Sub-rules of block OR rules can also be sub-rule of other rules.

A repetition rules return a "true" value when its sub-rule has one or more successful matches. A repetition rule can only have one sub-rule and can be a sub-rule of another rule.

A template-object rule is a sub-rule for encapsulating other map objects for extracting the input text content.

A symbolic tag rule returns a "true" value after a specified symbolic notation is identified. When calling this rule, the rule engine specifies a particular character as this rule's parameter. A symbolic tag rule does not have sub rules, but can be a sub rule of other rules.

A numeric tag rule returns a "true" value after a numeric notation is identified.

The numeric notation is typically a number and can be positive, negative, decimal, binary, hexadecimal, octal, finite, or infinite. The default value is infinity. Typically, a numeric tag rule does not have sub-rules, but can be a sub-rule of another map object.

A string rule returns a "true" value when the specified string is identified. Its parameter is a specified string. A string rule does not have sub-rules, but can be a sub-rule for other rules.

An existence rule returns a "true" value when one of a list of specified tags is matched. Note that the rule engine uses the symbolic-tag rule when there is only one tag to match. An existence rule does not have sub-rules, but can be a sub-rule of another rule.

A non-existence rule returns a "true" value when none of the tags within the input text content matches any of the specified tag strings. A non-existence tag rule does not have sub-rules, but can be a sub-rule of another rule.

Word rules and word-capitalization rules are used to extract words. Typically, the system does not specify the words to be extracted. The difference between a word rule and a word-capitalization rule is that word-capitalization rules are case sensitive. Word rules and word-capitalization rules do not have sub-rules, but can be sub-rules of other rules.

An empty rule is used to extract any element. It returns a "true" value in all cases.

The element-based input rules can be further categorized as elementary element-based input rules and advanced element-based input rules, based on their functionalities. Elementary element-based input rules are used to determine whether there is a match for the currently selected XML element. Advanced element-based input rules are used to not only determine whether there is a match for the current element, but also to identify matches for a series of elements, including the children elements of the current element, sub-elements, or children nodes of a text node.

Elementary element-based input rules include the following rules:

(1) Combination rules. A combination rule uses Boolean logic to combine its sub-rules. A combination rule can include Boolean operators such as "AND," "OR," and "NOT."

(2) Comparison rules. A comparison rule is used to determine whether an object satisfies a specific condition, such as "contain," "string equal," "number equal," "less than," "greater than," "equal or greater than," "equal or less than," "true," "false," "upper case," "lower case," "start with," etc.

(3) Steno rules. A steno rule is used to match certain attribute or name of an input element. Conditions in a steno rule includes "format contain," "format equal to," "name equal to," etc.

(4) Mixture rules. A mixture rule includes conditions such as "arbitrary," "existence," and "out of scope." With an "arbitrary" condition, the rule returns a "true" value with any element. The "existence" condition indicates whether the current element contains the object specified by the rule. The "out of scope" condition is used to determine whether the insertion point of an object is within the range of the specified element.

(5) Ownership rules. An ownership rule includes conditions such as "contain text" and "contain sub-element." The "contain text" condition returns a "true" value when the current element contains the specified text. The "contain sub-element" condition returns a "true" value when the current element contains any sub-element.

(6) Execution rules. An execution rule is used to call rules of other map objects, including "execution rule," and "offspring execution rule."

(7) XML path-language assessment rules. An XML path-language assessment rule is used to determine the value of XPATH. The rule engine activates this rule to evaluate the XPATH expression in the current element and returns the value of the XPATH expression.

(8) Miscellaneous rules. Miscellaneous rules include node-type rule, first-sibling-node rule, and last-sibling-node rule. A node-type rule determines whether a node is text, an XML element, or a CDATA area. The first-sibling-node rule and last-sibling-node rule determine whether the current element or node is the first or last node or element in a set of sibling nodes.

Advanced element-based input rules include the following rules:

(1) Syntax sequence rules. A syntax sequence rule is used to execute a series of XML input elements in sequence. A set of elements form a sequence, which in turn forms a hierarchical relationship in terms of syntax. These elements can be children elements, children nodes, or sibling nodes of the current element.

(2) Head-tail sequence rules. A head-tail sequence rule is used to execute a series of neighboring elements. The distinction between this rule and a syntax sequence rule is that this rule only pertains to the execution order of the start element and the end element, and is not concerned with the execution order of elements wherein between, whereas a syntax sequence rule all the elements in accordance with a specified order.

(3) Sub-map object rules. A sub-map object rule specifies one or more map objects as the current object's self-map object and executes these sub-map objects in a specified order.

Output Rules

The system uses output rules to output text content in a certain format after the text content is processed based on the map objects. A map object includes an output tag name, output value, and output attribute for an XML element produced by the system. An output tag name defines the tag name of an XML element produced by the system based on the output rules. The tag name can be a constant or the tag name of the original element. An output value defines the content of an output XML element, which is the result of text analysis. An output attribute specifies the attribute of the XML element. Each attribute can have one or more associated rules. That is, the attribute of a produced XML element can be a constant, specified text, or an XML element.

The output rules of a map object can have the following rules:

(1) "Not specified" rule indicates that an output element does not have a value, i.e., the output element does not have any text content.

(2) "Complete input text" rule indicates that the value of an output element is the input content extracted based on the input rules. If the input content is text, the text will be copied to the output element; if the input content is an XML element, the text content of the element will be copied to the output element.

(3) "Input" rule allows the system to set the content of an output element based on the content extracted from the input content based on certain method. For example, the content of the output element can be a piece of input text, the corresponding attribute of the input text, or the result from executing an XPATH expression.

(4) "Constant" rule indicates that the value of an output element is a fixed text string.

(5) "Sub result" rule indicates that the value of an output element is a sub-map object of the currently map object.

(6) "Maximum sub result" rule indicates that the output result of the current map object is the maximum value of the output XML elements of all sub-map objects of the current map object.

(7) "Average sub result" rule indicates that the output result of the current map object is the average value of the output XML elements of all sub-map objects of the current map object.

(8) "Table mapping" rule allows the system to build a correspondence table between the output elements and input content. For example, a correspondence can be established between the values of an input element which are "male" and "female" and the values of an output element which are "M" and "F."

System Operation

Figure 3:
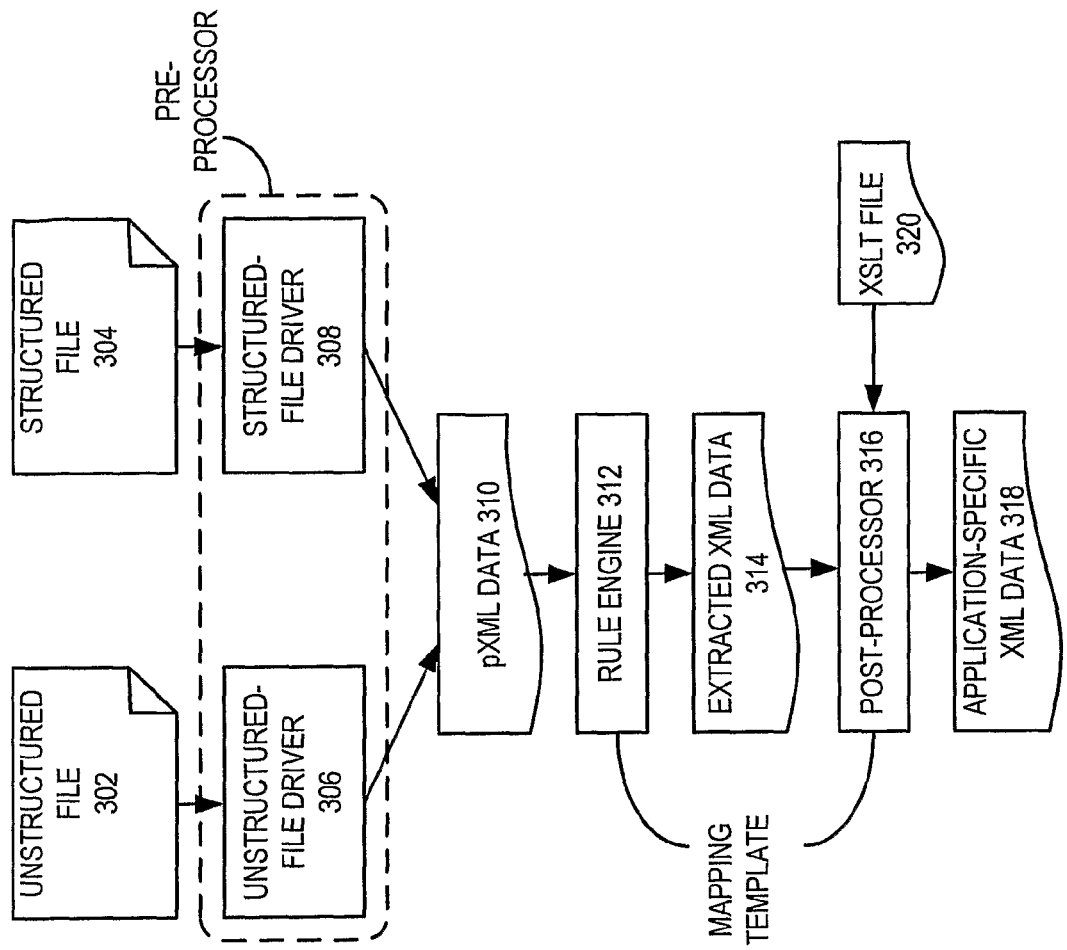
FIG. 3 presents a flow chart illustrating an exemplary process of operation of a system that facilitates rule-based content mining in accordance with one embodiment of the present invention.

FIG. 3 presents a flow chart illustrating an exemplary process of operation of a system that facilitates rule-based content mining in accordance with one embodiment of the present invention. During operation, the system can receive an unstructured file 302 as well as a structured file 304. Unstructured file 302 is processed by an unstructured-file drier 306. Correspondingly, structured file 304 is processed by a structured-file driver 308. For example, unstructured file 302 can be a PDF, WORD, RTF, POWERPOINT, HTML, or MIF file.

In one embodiment, both unstructured-file driver 306 and structured-file driver 308 produce pXML files as the result of file analysis. pXML data 310 is then passed to a rule engine 312. For example, pXML data 310 can contain elements corresponding to the input file, such as elements SECTION, PAGE, PARAGRAPH, SPECIALTEXT, TEXT, IMAGE, and LINK. Rule engine 312 includes a number of map objects. The input rules of a map object are used to perform text matching to the pXML element content, and to extract the text content specified by the mapping rules. Rule engine 312 further uses output rules to determine the format of the output text content based on the pXML data 310.

The extracted XML data 314 produced by rule engine 312 is then sent to a post-processor 316, which produces application-specific XML data 318 based on specified XSLT file 320. Note that, in one embodiment, both rule engine 312 and post-processor 316 use map templates.

In one embodiment, rule engine 312 uses pattern-recognition techniques to identify specific content in the input document, such as chapters, sections, paragraphs, or keywords. After identifying such content, rule engine 312 creates the corresponding output XML elements. Post-processor 316 then produces output file or data stream based on the map template. The output of a map object can include an element and the corresponding parent elements, ancestor elements, children elements, and sibling elements.

A map object is the basic component of a map template, and is used to transform a free-format, non-structured or semi-structured document into an XML file. A map object extracts meaningful content from non-structured text content and generates XML files with semantics. Generally, map objects rely on the transformation of the source file content and determines the name of the output XML element based on the definition specified in the map object. For example, a map object can be used to locate a date in the text. The output element generated by the map object can be named <Date></Date>.

A map template can be considered as a set of map objects. Each map object generates at least one output element. Therefore, in the output XML file, an output element is generated by a map object, wherein the XML file has one root element. Thus, the output XML file has a format similar to the following:

```
<PressRelease>
<title> </title>
<subtitle> </subtitle>
<bookname></bookname>
<prdate> </prdate>
<body>
<para>Si Ku Quan Shu - 12/17/02 -
<Bookurl>www.books.com.cn/skqs.html</ Bookurl > announced today that . . .
</para>
<para> . . .
</para>
</body>
</PressRelease>
```

TABLE 1

```
<MAPOBJECTname="header_paragraph" sourcetype="XML">
    <InputRules rulesettype="XML">
        <Rule ruletype="XML" xmlmatchtype="AND">
            <XML Rule xmlmatchtype="NAME_EQUALS"
                ruleobject="NodeName.PARAGRAPH"/>
            <XML Rule xmlmatchtype="STRING_EQUALS"
                rulesubject="Current.emphasis" ruleobject="Constant.true"/>
            <XML Rule xmlmatchtype="STRING_EQUALS"
                rulesubject="Current.emphasis-bold" ruleobject="Constant.true"/>
            <XML Rule xmlmatchtype="STRING_EQUALS"
                rulesubject="Current.font" ruleobject="Constant.Times"/>
            <XML Rule xmlmatchtype="STRING_EQUALS"
                rulesubject="Current.font-color" ruleobject="Constant.#000000"/>
            <XML Rule xmlmatchtype="STRING_EQUALS"
                rulesubject="Current.font-size" ruleobject="Constant.11"/>
        </Rule>
    </InputRules>
    <OutputRules>
        <OutputAttribute outputname="number" outputtype="input"
            inputtype="attribute" inputname="number"/>
    </OutputRules>
    <Children xmldildrenpasstype="currentelement" childsettype="alternate">
        <OBJECCTref="PARA_BODY" minOccurs="0" maxOccurs="unbounded"/>
    </Children>
</MAPOBJECT>
```

TABLE 1 illustrates an exemplary instance of a map object with the name "header_paragraph." The input content for this map object is an XML element, and the type of input rules is "XML." The input rules have sub-rules called "NAME_EQUALS" and "STRING_EQUALS." The output rules are:

```
<OutputAttribute outputname="number" outputtype="input"
inputtype="attribute" inputname="number" />.
```

The sub-map object is defined as following:

```
<Children xmlchildrenpasstype="currentelement"
childsettype="alternate">
    <OBJECT ref="PARA_BODY" minOccurs="0"
maxOccurs="unbounded" />
</Children>
```

Input rules in a map object are used to search certain content from the input document. This content search is called input selection. The input selection process is similar to the process of selecting certain content from a document using a word processor. This process can include opening a document, searching for certain sentence, selecting the content of these sentences, etc. In one embodiment, the content of the whole sentence can be selected. The system can also define mapping rules and adopt pattern recognition techniques and Boolean combination to select part of the content or keywords in the sentence.

The output rules of a map object determines how a map object creates output XML element. For example, an output XML element can be as follows:

```
<Release type="news" date="5/12/05">
....some text ... some child elements ...
</Release>
```

The output rules of a map object determine how to construct the output XML element, including the output tag name, element attribute, output text, and CDATA node.

A map object can further include sub-map objects and sub-rules. A map object can call sub-map object after input selection to further process the content obtained from the input selection process. For example, when PARAGRAPH is selected by a map object, sub-map objects and sub-rules can be called to process the content in the PARAGRAPH element, text node, and other embedded elements. When the processed document is transformed into a pXML file, the map object traverses the children nodes of the selected element, including elements and text nodes, when the map object is configured as "able to execute child XML element or copy all text nodes." Each child node is traversed by the map object to find the first match of the input rules. Text nodes are usually generated from the source text and placed in the output document directly.

TABLE 2

```
<Map Template annotation="This template takes in an HTML file as input and
    turns it into docbook." Xmlns:xsi='http://www.w3.org/2001/XML Schema-
    instance" xsinoNamespace SchemaLocation="../grammar.xsd">
    <TransformationRules>
        <PreProcessingRule driver="HtmlDriverJ" extensions="html,htm"
            OutputExtension="xml" OutputParameters="Tables=False |Lists=True|
            Graphsics=True|FormattedText=True|BlankParas=True|PageBreaks=False|
            Links=True|CopyImages=True" DebugMode="False"/>
        <MainElement ref="Book Paragraphs">
            <OutputOptions encoding="UTF-16" indenting="False" standalone="True"
                version="1.0"/>
        </MainElement>
        <PostProcessingRule driver="MAPDriver" extensions=""
            OutputExtension="xml" OutputParameters="Package=docbook
            |Template=docbook.PostGrammer" DebugMode="False"/>
    </TransformationRules>
    <MAPOBJECTS>
        <MAPOBJECT name="BookParagraphs" sourcetype="XML">
            <InputRules passthru="True"/>
            <OutputRules />
            <MAPChildren xmlchildrenpasstype="childelements"
                childsettype="alternate">
                <MAPOBJECTref="Meta Title" minOccurs="0" maxOccurs="1"
                    onlypassif="HEAD"/>
                <MAPOBJECTref="BodyParagraphs" minOccurs="1" maxOccurs="1"
                    onlypassif="BODY"/>
            </MAPChildren>
        </MAPOBJECT>
        <MAPOBJECT name="MetaTitle" sourcetype="XML">
            <InputRules rulesettype="XML">
                <Rule ruletype="XML" xmlmatchtype="XPATH" select="TITLE"/>
            </InputRules>
            <OutputRules passthru="True" copychildren="True"
                copyattributes="True"/>
        </MAPOBJECT>
        . . .
        <MAPOBJECT name="caption_paragraph" sourcetype="XML">
            <InputRules rulesettype="XML">
                <Rule ruletype="XML" xmlmatchtype="AND">
                    <XMLRule xmlmatchtype="OR">
                        <XMLRule xmlmatchtype="CONTAINS"
                            rulesubject="PARAGRAPH.font-size"
                            ruleobject="MAPConstant.10"/>
                        <XMLRule xmlmatchtype="STRING_EQUALS"
                            rulesubject="PARAGRAPH.bold"
                            ruleobject="MAPConstant.true"/>
                        <XMLRule xmlmatchtype="CONTAINS"
                            ruleobject="MAPConstant.caption"/>
                    </XMLRule>
                    <XMLRule xmlmatchtype="OR">
                        <XMLRule xmlmatchtype="CONTAINS"
                            rulesubject="MAPCurrent.Text"
                            ruleobject="MAPConstant.Figure"/>
                        <XMLRule xmlmatchtype="CONTAINS"
                            rulesubject="MAPCurrent.Text"
                            ruleobject="MAPConstant.Table"/>
                        <XMLRule xmlmatchtype="CONTAINS"
                            rulesubject="MAPCurrent.Text"
                            ruleobject="MAPConstant.Example"/>
                    </XMLRule>
                </Rule>
            </InputRules>
            <OutputRules passthru="True" copychildren="True"
                copyattributes="True"/>
        </MAPOBJECT>
</MAP Template>
```

TABLE 2 is an exemplary instance of a map template which transforms an HTML document into a Docbook XML document in accordance with one embodiment of the present invention. The element <TransformationRules> in the map template contains the following:

(1) An HTML driver, HtmlDriverJ, in the pre-processor.
(2) A suffix of the file. Specifically, the input suffix extensions are ".html, .htm" and the output suffix extension is "xml."
(3) Rules for processing the content, which includes:

```
<OutputParameters="Tables=False|Lists=True|Graphics
=True|FormattedText=True|BlankParas=True|PageBreaks
=False|Links=True|CopyImages=True"
DebugMode="False" />
```

(4) File encoding rules, which specify the encoding to be UTF-16.
(5) Output format, which includes:

```
<PostProcessingRule driver="MAPDriver"
extensions=""
OutputExtension="xml"OutputParameters="
Package=docbook|Template= docbook.PostGrammar"
ebugMode="False" />
```

Figure 4:
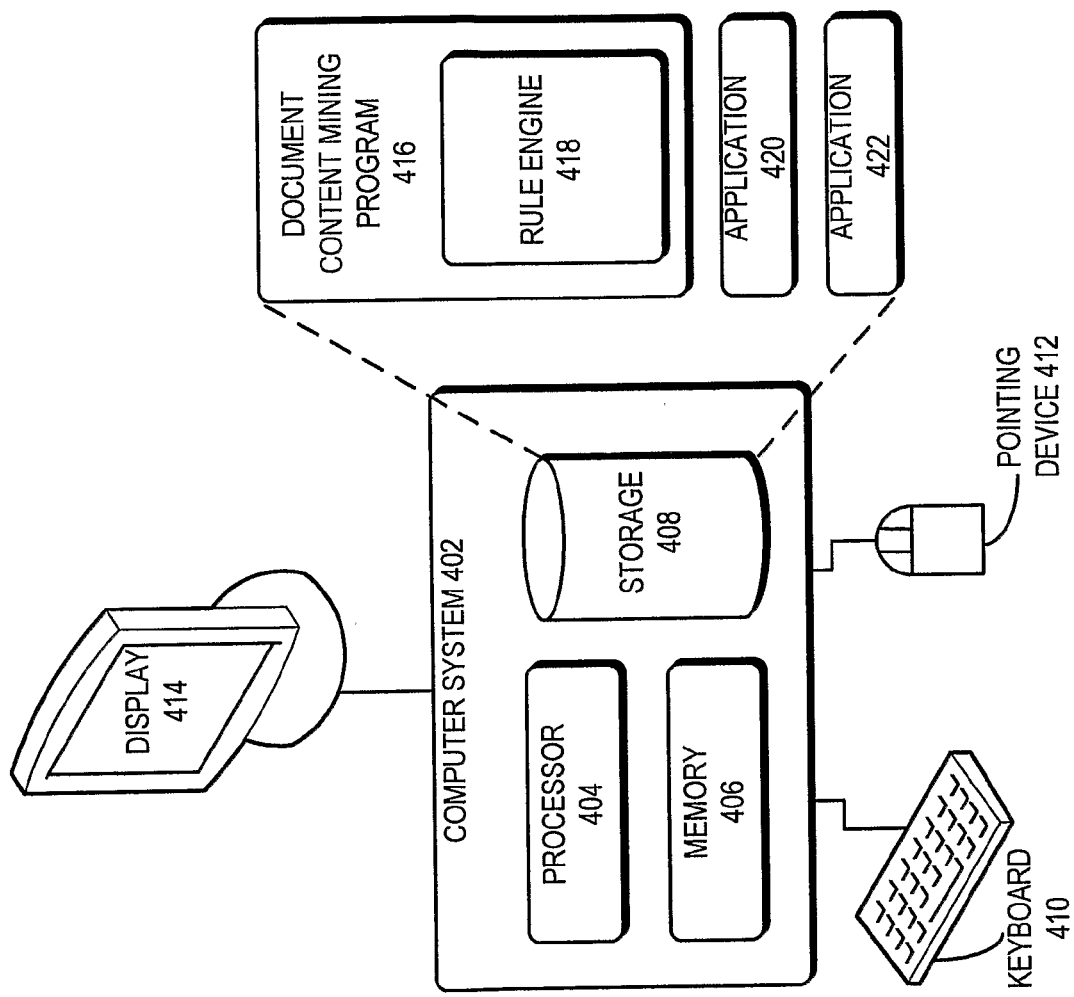
FIG. 4 illustrates an exemplary computer system for facilitating rule-based content mining in accordance with one embodiment of the present invention.

FIG. 4 illustrates an exemplary computer system for facilitating rule-based content mining in accordance with one embodiment of the present invention. A computer system 402 includes a processor 404, a memory 406, and a storage device 408. Also coupled to computer system 402 are a keyboard 410, a pointing device 412, and a display 414.

Storage device 408 stores a document content mining program 416, as well as applications 420 and 422. In one embodiment, document content mining program 416 further contains a rule engine 418. During operation, computer system 402 loads document content mining program 416 from storage device 408 into memory 406. Processor 404 executes the instructions from memory 406 and performs rule-based content mining on an input document.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating rule-based content mining to extract content from structured or unstructured data, the method comprising:
   receiving a file which contains structured or unstructured data, or a mixture of both;
   mining text content of the file to automatically recognize a component in the received file;
   converting the recognized component of the received file into semantic data, wherein the semantic data indicates one or more attributes for the recognized component;
   generating a processable extensible markup language (pXML) file, wherein a respective pXML element of the pXML file includes the semantic data associated with the recognized component;
   extracting content from the pXML file based on one or more map objects, wherein a respective map object specifies an input rule for analysis and/or output rule for formatting, wherein the respective map object further specifies one or more sub-map objects and/or sub-rules, and wherein the respective map object comprises one or more of:
      a map object name;
      a plug-and-play switch;
      an activation switch; and
      an activation order; and
   generating a semantic XML file corresponding to the received file and/or the extracted content based on one or more specified output rules, wherein generating the semantic XML file based on the specified output rules involves applying an XLST file or an external program and generating an application-specific XML file.

2. The method of claim 1, wherein extracting content from the pXML file involves applying a rule engine to the pXML file.

3. The method of claim 2, wherein the rule engine comprises the one or more map objects to analyze and extract content from the pXML file.

4. The method of claim 1, wherein the input rule can be a text-based input rule or an element-based input rule.

5. The method of claim 4, wherein the text-based input rule can be a text-analysis rule or a tag-syntax rule;
   wherein a text-analysis rule can include one or more of:
      a line rule, a fixed-length rule, a regular expression rule, a hypertext-tag rule, and a text-matching rule; and
   wherein a tag-syntax rule can include one or more of:
      a sequence rule, a block OR rule, a repetition rule, a template-object rule, a symbolic tag rule, a numeric tag rule, a string rule, an existence rule, a non-existence rule, a word rule, a word-capitalization rule, and an empty rule.

6. The method of claim 4, wherein the element-based input rule can be an elementary or advanced element-based input rule;
   wherein the elementary element-based input rule can include one or more of:
      a combination rule, a comparison rule, a steno rule, a mixture rule, an ownership rule, an execution rule, an XML path-language assessment rule, and a miscellaneous rule; and
   wherein the advanced element-based input rule can include one or more of:
      a syntax sequence rule, a head-tail sequence rule, and a sub-map object rule.

7. The method of claim 1, wherein the output rule can be one or more of:
   a "not specified" rule, a "complete input text" rule, an "input" rule, a "constant" rule, a "sub result" rule, a "maximum sub result" rule, an "average sub result" rule, and a "table mapping" rule.

8. A computer system for facilitating rule-based content mining to extract content from structured or unstructured data, the computer system comprising:
   a processor;
   a memory;
   a receiving mechanism configured to receive a file which contains structured or unstructured data, or a mixture of both;
   a text-mining mechanism configured to mine text content of the file to automatically recognize a component in the received file;

a pre-processor configured to:
  convert the recognized component of the received file into semantic data, wherein the semantic data indicates one or more attributes for the recognized component; and
  generate a processable extensible markup language (pXML) file, wherein a respective pXML element of the pXML file includes the semantic data associated with the recognized component;
a rule-engine configured to extract content from the pXML file based on one or more map objects, wherein a respective map object specifies an input rule for analysis and/or an output rule for formatting, wherein the respective map object further specifies one or more sub-map objects and/or sub-rules, and wherein the respective map object comprises one or more of:
  a map object name;
  a plug-and-play switch;
  an activation switch; and
  an activation order; and
a post-processor configured to generate a semantic XML file corresponding to the received file and/or the extracted content based on one or more specified output rules, wherein generating the semantic XML file based on the specified output rules involves applying an XLST file or an external program and generating an application-specific XML file.

9. The computer system of claim 8, wherein the rule engine comprises the one or more map objects to analyze and extract content from the pXML file.

10. The computer system of claim 8, wherein the input rule can be a text-based input rule or an element-based input rule.

11. The computer system of claim 10, wherein the text-based input rule can be a text-analysis rule or a tag-syntax rule;
  wherein the text-analysis rule can include one or more of:
    a line rule, a fixed-length rule, a regular expression rule, a hypertext-tag rule, and a text-matching rule; and
  wherein the tag-syntax rule can include one or more of:
    a sequence rule, a block OR rule, a repetition rule, a template-object rule, a symbolic tag rule, a numeric tag rule, a string rule, an existence rule, a non-existence rule, a word rule, a word-capitalization rule, and an empty rule.

12. The computer system of claim 10, wherein the element-based input rule can be an elementary or advanced element-based input rule;
  wherein the elementary element-based input rule can include one or more of:
    a combination rule, a comparison rule, a steno rule, a mixture rule, an ownership rule, an execution rule, an XML path-language assessment rule, and a miscellaneous rule; and
  wherein the advanced element-based input rule can include one or more of:
    a syntax sequence rule, a head-tail sequence rule, and a sub-map object rule.

13. The computer system of claim 8, wherein the output rule can be one or more of:
  a "not specified" rule, a "complete input text" rule, an "input" rule, a "constant" rule, a "sub result" rule, a "maximum sub result" rule, an "average sub result" rule, and a "table mapping" rule.

14. A non-transitory computer-readable storage medium storing instructions that when executed by a computer system cause the computer system to:
  receive a file which contains structured or unstructured data, or a mixture of both;
  mine text content of the file to automatically recognize a component in the received file;
  convert the recognized component of the received file into semantic data, wherein the semantic data indicates one or more attributes for the recognized component;
  generate a processable extensible markup language (pXML) file, wherein a respective pXML element of the pXML file includes the semantic data associated with the recognized component;
  extract content from the pXML file based on one or more map objects, wherein a respective map object specifies an input rule for analysis and/or output rule for formatting, wherein the respective map object further specifies one or more sub-map objects and/or sub-rules, and wherein the respective map object comprises one or more of:
    a map object name;
    a plug-and-play switch;
    an activation switch; and
    an activation order; and
  generate a semantic XML file corresponding to the received file and/or the extracted content based on one or more specified output rules, wherein generating the semantic XML file based on the specified output rules involves applying an XLST file or an external program and generating an application-specific XML file.

* * * * *